United States Patent [19]

Hagio et al.

[11] 4,430,279
[45] Feb. 7, 1984

[54] PROCESS FOR PRODUCING ZIRCONIA YTTRIA GRINDING MEDIA USED FOR GRINDING MAGNETIC COATING POWDER

[75] Inventors: Takehiko Hagio, Dazaifu; Michito Miyahara, Fukuoka, both of Japan

[73] Assignee: Nippon Tungsten Co., Ltd., Fukuoka, Japan

[21] Appl. No.: 495,816

[22] Filed: May 18, 1983

Related U.S. Application Data

[62] Division of Ser. No. 412,297, Aug. 27, 1982, abandoned.

[30] Foreign Application Priority Data

Aug. 28, 1981 [JP] Japan ................................ 56-135765

[51] Int. Cl.$^3$ ............................................. C04B 35/48
[52] U.S. Cl. ..................................... 264/65; 241/184; 264/63; 264/66; 264/325; 264/DIG. 25; 360/135; 360/137; 501/103
[58] Field of Search ....................... 264/56, 63, 65, 66, 264/325, DIG. 25; 501/103

[56] References Cited

U.S. PATENT DOCUMENTS 3,301,646 1/1967 Smoot ................................. 51/309
3,432,314 3/1969 Mazdiyashni et al. .............. 501/103
3,929,498 12/1975 Hancock et al. .................... 501/103
4,041,123 8/1977 Lange et al. ......................... 264/332
4,316,964 2/1982 Lange .................................. 501/105
4,344,904 8/1982 Yamada et al. ....................... 264/66
4,360,598 11/1982 Otagiri et al. ......................... 264/56
4,383,957 5/1983 Yamakawa et al. ................. 264/325

FOREIGN PATENT DOCUMENTS 935800 10/1973 Canada .
2712697 3/1978 Fed. Rep. of Germany ...... 241/184

OTHER PUBLICATIONS

Rieth, P. H. et al., Fabrication and Flexural Strength of Ultrafine Grained Yttria–Stabilized Zirconia, Cer. Bull. 55(8) Aug. 1976, pp. 717-721 and 727.

*Primary Examiner*—Helen M. McCarthy
*Attorney, Agent, or Firm*—James J. Ralabate

[57] ABSTRACT

This invention discloses zirconia-containing grinding media in the preparation of magnetic disc coating and method for producing such grinding media. The grinding media essentially consists of zirconia-sintered body containing 3.6% to 8.0% by weight of yttrium oxide, the zirconia sintered body having a means grain size of less than 2 μm and the relative theoretical density of more than 98.0%.

2 Claims, No Drawings

PROCESS FOR PRODUCING ZIRCONIA YTTRIA GRINDING MEDIA USED FOR GRINDING MAGNETIC COATING POWDER

This is a division of application Ser. No. 06/412,297 filed Aug. 27, 1982, now abandoned.

BACKGROUND OF THE INVENTION

This invention relates to a zirconia-containing grinding media in the preparation of magnetic disc coating and a method for producing the same.

These days, coated discs have been predominantly used on a commercial basis as magnetic discs for computors. The packing density of the coated discs which plays a decisive role in the improvement of the performance of computors has steadily increased in the past decade, namely 4040 BPI in 1974, 6400 BPI in 1976 and 7000 BPI in 1980. Such improvement of the packing density has been mainly achieved by improvement of $\gamma$-$Fe_2O_3$ which is used as magnetic powder for coating. Namely, improvements have been made on the property of $\gamma$-$Fe_2O_3$ per se such as the grain size and the needle-like crystal ratio of $Fe_2O_3$ powder, or the thickness of the coating, the surface roughness of the coating, the orientation of magnetic field, or the disc/head spacing.

For example, the thickness of the magnetic layer on an aluminum alloy substrate has been improved, e.g. 2.0 $\mu$m in 1974, 0.7 $\mu$m in 1976 and 0.25 $\mu$m in 1980. The surface roughness has been improved, e.g. 0.05 Ra in 1974, 0.02 Ra in 1976 and 0.01 Ra in 1980. The flying height of the magnetic head has been improved enabling the narrowing of the flying gap, e.g. 0.8 $\mu$m in 1974, 0.45 $\mu$m in 1976 and 0.2 $\mu$m in 1980.

In this manner, the improvement of the packing density of the magnetic disc has largely relied on the improvement of the precision and the property of the magnetic coating surface.

It has been found that the grinding of $\gamma$-$Fe_2O_3$ powder plays an important role in the above improvement of the precision and the property of the magnetic coating surface.

However, conventionally the grinding of $\gamma$-$Fe_2O_3$ has been conducted using $Al_2O_3$ balls as grinding media. The maximum packing density of the coated disc obtainable with alumina balls is limited to the above 7000 BPI.

The reason is that, in the grinding operation, fine $Al_2O_3$ particles are worn out or peeled off from the media and are contaminated into $\gamma$-$Fe_2O_3$ powder, and the removal of such contaminated fine $Al_2O_3$ particles from the $\gamma$-$Fe_2O_3$ powder is extremely difficult with the present techniques. Therefore, the ground $\gamma$-$Fe_2O_3$ powder is coated on the surface of a disc while containing fine $Al_2O_3$ paricles therein. However, due to the presence of the fine $Al_2O_3$ particles, even when a surface treating such as varnishing is provided on the coated disc surface, the improvement of the surface roughness has a limitation, making the further narrowing of the flying gap impossible. Namely, the flying height of the head is, in general, irrelevant to the average surface roughness (Ra), but to the height (R+max) of fine peaks on a roughness curve, and these fine peaks are made of fine $Al_2O_3$ particles contaminated in the coating of the disc.

Therefore, the improvement of the packing density of the coated disc has been restricted to 7000 BPI due to the use of $Al_2O_3$ media.

Whereas, the demand for a coated disc with higher packing density, for example, 20,000 BPI (100TPI) or 25,000 BPI is of a crucial task of these days.

Accordingly, it is an object of the present invention to provide grinding media in either balls or cylinders which can overcome above defects of the conventional $Al_2O_3$ grinding media, and thereby can greatly improve the packing density of the coated disc.

It is another object of the present invention to provide a method which can produce the above grinding media in a most efficient manner.

In summary, the present invention discloses grinding media in the preparation of magnetic disc coating which essentially consists of zirconia sintered body partially stabilized with 3.6% to 8.0% by weight of yttrium oxide, the sintered body having an average grain size of less than 2 $\mu$m, and the relative theoretical density of more than 98.0%, and method for producing the above media by either a cold press method or a hot isostatic pressing method.

The grinding media of this invention as described above normally contains 3.6 to 8.0% by weight of yttrium oxide for maintaining the requisite properties of the media for grinding. Such requisite properties is that the sintered body must have little closed pores and fine grains. When the amount of yttrium oxide is less than 3.6% by weight, cracks occur during the sintering process due to the transition of the zirconia powder. When the amount of yttrium oxide exceeds 8% by weight, the inner structure of the sintered body becomes coarse giving rise to many closed pores and/or coarse pores. To restrict the occurrence of closed pores, it may be possible to carry out the sintering at a higher temperature and under higher pressure than normal sintering condition. However, such sintering makes the grain of the sintered body coarse so that the sintered body suffers the poor wear resistance, and accordingly is no longer useful as a grinding media.

The grain size of zirconia sintered body should be less than 2 $\mu$m and should preferably be less than 1.5 $\mu$m. Even when the sintered body is produced from a starting material having extremely high purity, the sintered body having a coarse grain size has a short life-time due to the defects specific to polycrystalline body such as impurities included in the process of production, fine cracks present in the sintered body and the large difference in physical properties between the grain and surrounding boundaries of the inner structure. Accordingly, it is inevitable to make the grain size of the sintered body less than 2 $\mu$m so as to make thin the grain boundaries where the above defects of polycrystalline body start to occur. When the grain size exceeds 2 $\mu$m, the grain boundaries become thick and the coarse pores increase in number so that the inner structure of the sintered body becomes inhomogeneous and thereby suffers the poor wear resistance resulting in a grinding media having a short life time. Furthermore, the relative theoretical density of the grinding media of this invention should be more than 98%, and preferably more than 99% to have desired properties of the grinding media. This is proved by various tests including Experiments I to III described later.

The grinding media and method for producing the grinding media are further explained in view of the following experiments.

The above grinding media of the present invention and the manner of producing such grinding media is further described in detail hereinafter.

Zirconia powder which is used as a starting material and contains 3.6% to 8.0% by weight of yttrium oxide should have an average particle size of less than 0.5 μm, and preferably less than 0.3 μm.

Furthermore, in the powder, yttrium oxide should be uniformly dispersed and present in a form of solid solution in zirconia. Therefore, it is desirable to take a following mixing method rather than directly mixing zirconia powder with yttrium oxide powder to prepare the starting material.

(i) Solid solutions containing zirconium compound and yttrium compound respectively were mixed in a liquid phase and the mixture was roasted at a temperature of 400° C. to 1200° C.

(ii) The solution containing zirconia compound and yttria (or zirconia and the solution containing the yttrium compound) were uniformly mixed, and the mixture was roasted.

When the primary particles of the powder obtained by the above method were strongly agglomerated, the particles were first dispersed by a wet grinding and subsequently was dried to produce powder for compacting. For improving the strength of a green compact produced from the above powder and making the density of the green compact more homogeneous, the powder may contain a compacting aid such as polyvinyl alcohol, stearic acid or wax emulsion so as to make an average particle size of the powder to 10 μm to 300 μm. The powder thus obtained was compacted at a pressure of more than 0.5 ton/cm$^2$, preferably 1 ton/cm$^2$ to 3 ton/cm$^2$ taking the economy into account. The compact was then molded in a shape of a grinding media and was sintered in an atmosphere at a temperature of 1400° C. to 1800° C., preferably 1450° C. to 1750° C. to obtain the grinding media of this invention.

Although the grinding media of this invention can be produced by the above sintering method, it is preferable to conduct a HIP treatment after a presintering either in air or in an inert gas atmosphere to obtain a grinding media having higher relative theoretical density. Namely, a green compact is sintered in either air or an Ar gas atmosphere at 12000° C. to 1650° C., preferably 1250° C. to 1600° C. to obtain a presintered compact having a relative theoretical density of 95% to 98%. Subsequently, the presintered compact is subjected to the HIP treatment in either air or an inert gas atmosphere under a pressure of more than 500 kg/cm$^2$ and at a temperature of 1200° C. to 1550° C., preferably under a pressure of more than 500 kg/cm$^2$ and at a temperature of 1250° C. to 1500° C. The obtained sintered body had a relative theoretical density of more than 99%. The grinding media produced from the above HIP sintered body has a prolonged life time and an improved surface luster.

When either the sintering temperature or the sintering pressure of the HIP treatment is less than 1200° C. or less than 500 kg/cm$^2$ respectively, the sintered body can not acquire the relative theoretical density of more than 98.0%. When the sintering temperature exceeds 1550° C., the grains of the sintered body become coarse with the size thereof more than 2 μm, even when the sintering pressure of 500 kg/cm$^2$ is achieved so that the grinding media has a short life time.

EXPERIMENT I

Aqueous solution containing zirconium oxychloride (purity 99.9% by weight) and yttrium chloride (purity 99.9% by weight) was agitated under heating to effect hydrolysis thereof. The composition ratio of the above two compounds was adjusted as $ZrO_2$ and $Y_2O_3$ respectively as shown in Table 1. n-Octyl alcohol and added to the hydrolysis solution and the solution was subjected to drying by distillation. As a result of drying, fine particles of zirconium-containing compound were obtained. These fine particles were roasted at 850° C. to produce primary-particle powder of zirconium oxide, wherein each primary particle was either monoclinic crystal structure or tetragonal crystal structure which includes $Y_2O_3$ as dispersed solid-solution and had the grain size of 100 Å to 300 Å. The powder was subjected to a wet ball milling for 48 hours where the powder was dispersed, dried and sized to produce compacting powder having an average particle size of 100 μm.

(I) The compacting powder was compacted at a pressure shown in Table 1 to produce a spherical green compact. The spherical green compact was sintered in either air or an inert gas atmosphere (argon) with an atmospheric sintering condition as shown in Table 1 to obtain a sintered body used for a grinding media.

(II) The spherical green compact obtained in the same manner as the above process (I) were sintered with an atmospheric sintering condition of test pieces Nos. (iv) to (vi) Table 1 to produce presintered bodies having the relative theoretical density of 96% and 97.5% respectively. These presintered bodies were placed in a high-pressure vessel provided with a heater and were subjected to a HIP (hot isostatic pressing) treatment for one hour with sintering conditions shown in Table 1. The HIP sintered bodies were designated as test pieces (iv) and (vi) in Table 1. In Table 1, test piece No. (xi) was produced by using powder of primary particles having an average particle size of 0.8 μm.

Furthermore, all test pieces (except for (i), (iv) and (vi)) were subjected to the HIP treatment with sintering conditions shown in Table 2. All test pieces (except for test piece (vii) and (xi)) showed a relative theoretical density of more than 98.0%. No change was observed as to an average particle size before or after the HIP treatment.

TABLE 1

| test piece | composition (% by weight) $Y_2O_3$ | composition (% by weight) $ZrO_2$ | compacting pressure (ton/cm$^2$) | atmospheric sintering (temperature × hold time) (°C. × hr) | HIP (temperature × pressure) (°C. × kg/cm$^2$) | relative theoretical density % | mean grain size (μm) |
|---|---|---|---|---|---|---|---|
| (i) reference | 3.5 | 96.5 | 3 | 1700 × 3 | — | crack occurred | — |
| (ii) | 4.1 | 95.9 | 3 | 1600 × 2 | — | 99.1 | 0.7 |
| (iii) | 4.8 | 95.2 | 2 | 1580 × 2 | — | 99.3 | 0.8 |

TABLE 1-continued

| test piece | composition (% by weight) Y$_2$O$_3$ | ZrO$_2$ | compacting pressure (ton/cm$^2$) | sintering condition atmospheric sintering (temperature × hold time) (°C. × hr) | HIP (temperature × pressure) (°C. × kg/cm$^2$) | relative theoretical density % | mean grain size (μm) |
|---|---|---|---|---|---|---|---|
| (iv) | " | " | 2 | 1420 × 1 | 1420 × 1000 | 99.7 | 1.0 |
| (iv') | " | " | 2 | 1450 × 1.5 | — | 99.5 | 1.2 |
| (iv") | " | " | 2 | 1430 × 1 | 1420 × 1000 | 99.6 | 1.1 |
| (v) | 5.4 | 94.6 | 1 | 1550 × 3 | — | 98.7 | 1.0 |
| (vi) | 5.4 | 94.6 | 1 | 1450 × 2 | 1400 × 1000 | 99.5 | 1.2 |
| (vi') | " | " | 1 | 1570 × 2 | — | 99.0 | 1.3 |
| (vi") | " | " | 1 | 1470 × 2 | 1450 × 1000 | 99.6 | 1.3 |
| (vii) reference | " | " | 5 | 1380 × 5 | — | 97.5 | 0.7 |
| (viii) | 7.1 | 92.9 | 2 | 1650 × 2 | — | 99.0 | 1.6 |
| (ix) | 7.95 | 92.05 | 2 | 1650 × 3 | — | 98.7 | 1.8 |
| (x) reference | " | " | 3 | 1820 × 2 | — | 99.0 | 3.0 |
| (xi) reference | " | " | 1 | 1720 × 3 | — | 95.0 | 5.0 |
| (xii) reference | 9.0 | 91.0 | 2 | 1700 × 3 | — | 98.5 | 5.0 |

Note
1 Test pieces No. (iv) and No. (vi) were sintered in an inert gas (argon) atmosphere.
2 Test pieces No. (iv"), No. (vi") were obtained by presintering the powder in an inert gas (argon) atmosphere to obtain a presintered compact having the relative theoretical density of 96.5% and subsequently subjecting the presintered compact to HIP treatment.

TABLE 2

| test piece Nos. | HIP temperature × pressure (°C. × kg/cm$^2$) |
|---|---|
| ii | 1450 × 500 |
| iii | " |
| v | 1300 × 1800 |
| vii | 1300 × 450 |
| viii | 1500 × 1000 |
| ix | 1550 × 500 |
| x | 1650 × 1500 |
| xi | " |
| xii | " |

EXPERIMENT II

A wear test was performed on the following media:
Media A (containing 91% by weight of Al$_2$O$_3$ and conventionally widely used as grinding media due to its high wear resistance)
Media A' (containing 99.5% by weight of Al$_2$O$_3$ and also conventionally widely used as grinding media due to its high wear resistance)
Media B (containing 96% by weight of ZrO$_2$ and 3.0% by weight of MgO)
Media C (test piece (ii) of Table 1)
Media D (test piece (vi) of Table 1)

In the test, all media had the same spherical shape having the diameter of 10 mm.
Other testing conditions were as follows:
ball mill pot:
  inner diameter: 150 mm
  inner capacity: 3600 ml
  media placed in the pot: 2000 gr
  water added: 700 cc
  material to be ground: 1000 gr (silicious stone of 25 to 40 mesh)
  grinding time: 24 hours (pot rotating speed 80 rpm)
Grinding test was carried out with the above conditions and the wear rate was observed. The results were;
Media A: 0.3%
Media A': 1.0%
Media B: 3.5%
Media C: 0.014%
Media D: 0.011%

This proves that the product of this invention has about 250 times higher wear resistance than ZrO$_2$ containing media B, and about 20 times higher wear resistance than Al$_2$O$_3$ containing media A.

EXPERIMENT III

γ-Fe$_2$O$_3$ having an average particle size of 5 μm and a maximum particle size of 20 μm was ground for 100 hours with various balls used in Experiment II and the particle size of the ground γ-Fe$_2$O$_3$ was observed. The result of the observation was;

|  | average particle size (μm) | maximum particle size (μm) |
|---|---|---|
| Media A | 0.4 | 10 |
| Media A' |  |  |
| Media B | 0.35 | 7 |
| Media C | 0.25 | 3 |
| Media D | 0.25 | 2.8 |

Furthermore, the ground γ-Fe$_2$O$_3$ powder was subjected to the analysis of scanning electron microscope. The result showed that in the γ-Fe$_2$O$_3$ powder ground by Media A and A', particles having the size of 1 μm to 3 μm assumed to be the wear or peeling-off the media were observed, while particles having the size of 20 μm assumed to be the fracture of the media were observed in the γ-Fe$_2$O$_3$ powder ground by Media B.
In the ground γ-Fe$_2$O$_3$ powder ground by Media C and D of the peresent invention, no particle assumed to be the wear of the media was found.

In the above Experiments I to III, the relative theoretical density of zirconia containing sintered body was determined in the following manner. The theoretic density of the zirconia containing 3.6% by weight of Y$_2$O$_3$ was determined to be 6.15 g/cm$^3$, and, along with the increase of Y$_2$O$_3$ addition, the density was linearly decreased and when the Y$_2$O$_3$ addition was 8% by weight, the theoretical density was determined to 6.05 g/cm$^3$.

As has been described heretofore, the grinding media of this invention has the following advantages compared with the conventional grinding media.

(i) Conventionally, as the grinding media for magnetic material, $Al_2O_3$ containing balls or alumina-containing cylindrical media have been used. However, since the $Al_2O_3$ particles worn out or peeled off from the $Al_2O_3$ balls are mixed into the magnetic material powder, the particles provide fine peaks at the process of applying a coating on the disc. Even a varnishing is conducted to the coated surface, since the coating has such peaks which has an extremely high hardness and wear resistance, smoothing of the mean surface roughness (Ra) of the coating surface, namely lowering of height of the most harmful fine peaks has a limitation. In fact, it has been extremely difficult to make the flying height of the head less than 0.3 μm.

Later, $ZrO_2$ containing media (Media B) shown in the above Experiments II, III were used on a trial basis as the grinding media for some specific kinds of magnetic material. Although the media also produces many worn-out or peel-off particles, since the height of the fine peaks can be lowered by varnishing than the case of $Al_2O_3$-containing media, the flying height of the head is improved in the order of 0.2 μm.

However, the conventional $ZrO_2$ containing media has poor density, coarse grains and low wear resistance as shown in Table 3, a magnetic disc provided with highly improved packing density is impossible with such media.

TABLE 3

|  | specific gravity | hardness ($H_RA$) | constituent grain size | bending strength (kg/mm$^2$) |
|---|---|---|---|---|
| Media A | 3.6 | 86.5 | 2 μm | 28 |
| Media A' | 3.9 | 92.0 | 3 μm | 38 |
| Media B | 5.5 | 84 | 80 μm | 20 |
| product of this invention |  |  |  |  |
| test piece No. (iii) | 6.08 | 90.8 | 0.8 μm | 120 |
| test piece No. (vi) | 6.08 | 91.7 | 1.2 μm | 150 |

As can be readily understood from Table 3, all the products of this invention has extremely high density, fine grain size, and high hardness and bending strength.

Due to the above favorable properties, the grinding media of this invention has high wear resistance incomparable to the conventional media. Furthermore, the grain boundaries of the media of this invention has the high bending strength to prevent the peel-off of the grains. Accordingly, the media of this invention can eliminate the occurrence of the fine peaks made of wear particles of the media whereby the flying height of the head can be lowered in the order of 0.1 μm. This eventually brings about the remarkable improvement of the packing density.

(ii) As another feature of the media of the present invention, the media has the elasticity of $1.6 \times 10^4$ kg/mm$^2$ lower than the corresponding value of the conventional $Al_2O_3$ containing media so that the peeling-off of the media caused by any impact to the media can be prevented.

(iii) Furthermore, since the media of this invention has a lower friction coefficient than the conventional media, media balls easily slip from each other when they come into contact during the grinding operation so that the wear can be prevented at minimum.

(iv) Still another advantage of the grinding media of this invention is that the media has the greater specific gravity than the conventional media, namely the specific gravity of the media of this invention is 1.7 times greater than the conventional $Al_2O_3$ containing media. Therefore, such media can improve the grinding efficiency and hold the grinding surface always smooth, whereby the particle size of the magnetic material powder can be made finer.

Table 3 shows the result of the friction resistance test on the test pieces (iii) and (vi) of the experiments II and III. The applicant conducted the test also on other test pieces shown in Table 1, and the result showed that all grinding media of this invention had the wear coefficient of 0.011 to 0.030%.

Still furthermore, it was proved that the media produced by conducting HIP treatment after the presintering has slightly higher wear resistance than the media sintered either in the air or an inert gas atmosphere after compacting.

What we claim is:

1. A process for producing zirconia grinding media used for grinding a magnetic coating powder having an improved packing density comprising:
    (a) preparing primary particle powder of zirconium oxide, said primary particle having monoclinic crystal structure and tetragonal crystal structure which includes about 3.6 to 8.0 percent by weight of yttrium oxide as dispersed solid solution, said primary particle powder having the mean grain size of less than 0.5 micron,
    (b) compacting said primary particle powder at a pressure of more than 500 kg/square centimeter into a green compact, and
    (c) sintering said green compact in the air or an inert gas atmosphere at a temperature of about 1400° C. to 1800° C. to obtain thereby a sintered body having a mean grain size of up to about 2 microns and a relative theoretical density of at least 98 percent.

2. A process for producing zirconia grinding media used for grinding a magnetic coating powder having an improved packing density comprising:
    (a) preparing primary particle powder of zirconium oxide, said primary particle having monoclinic crystal structure and tetragonal crystal structure which includes about 3.6 to 8.0 percent by weight of yttrium oxide as dispersed solid solution, said primary particle powder having the mean grain size of less than 0.5 micron,
    (b) compacting said primary particle powder at a pressure of more than 500 kg/square centimeter into a green compact,
    (c) presintering said green compact in the air or in an inert gas atmosphere at a temperature of about 1200° C. to 1650° C. produce a presintered body having a relative theoretical density of about 95 percent to 98 percent, and
    (d) subjecting said presintered body to a hot isostatic pressing in an inert gas atmosphere at a pressure of more than 500 kg/square centimeter and a temperature of about 1200° C. to 1550° C. to obtain thereby a sintered body having a mean grain size of up to about 2 microns and a relative theoretical density of at least 99 percent.

* * * * *

UNITED STATES PATENT AND TRADEMARK OFFICE
CERTIFICATE OF CORRECTION

PATENT NO. : 4,430,279
DATED : Feb. 7, 1984
INVENTOR(S) : Takehiko Hagio, et al.

It is certified that error appears in the above-identified patent and that said Letters Patent are hereby corrected as shown below:

Change the Inventors From:

"Takehiko Hagio, Dazaifu;
Michito Miyahara, Fukuoka, Both of Japan"

To:

----Takehiko Hagio, Fukuoka;
Michito Miyahara, Fukuoka;
Mitsuhiko Furukawa, Fukuoka; all of Japan----

Signed and Sealed this

Seventh Day of August 1984

[SEAL]

Attest:

GERALD J. MOSSINGHOFF

Attesting Officer

Commissioner of Patents and Trademarks